US011838700B2

(12) United States Patent
White et al.

(10) Patent No.: US 11,838,700 B2
(45) Date of Patent: *Dec. 5, 2023

(54) HIGH DENSITY BEZEL FOR PATCH PANEL

(71) Applicant: COMMSCOPE TECHNOLOGIES LLC, Hickory, NC (US)

(72) Inventors: Gordon John White, Gloucester (GB); Shawn Phillip Tobey, Trinity, NC (US); Brian J. Fitzpatrick, McKinney, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,204

(22) Filed: Jun. 6, 2022

(65) Prior Publication Data

US 2023/0021667 A1 Jan. 26, 2023

Related U.S. Application Data

(63) Continuation of application No. 16/624,432, filed as application No. PCT/US2018/038295 on Jun. 19, 2018, now Pat. No. 11,356,751.

(Continued)

(51) Int. Cl.
*H04Q 1/02* (2006.01)
*H01R 13/42* (2006.01)
(Continued)

(52) U.S. Cl.
CPC .............. *H04Q 1/13* (2013.01); *H01R 13/42* (2013.01); *H01R 13/518* (2013.01); *H01R 13/10* (2013.01)

(58) Field of Classification Search
CPC ........ H04Q 1/13; H04Q 1/09; H04Q 2201/02; H01R 13/42; H01R 13/518; H01R 13/10;
(Continued)

(56) References Cited

U.S. PATENT DOCUMENTS 3,666,996 A 5/1972 Brown
3,739,076 A 6/1973 Schwartz
(Continued)

FOREIGN PATENT DOCUMENTS

CN 101095264 A 12/2007
CN 101510649 A 8/2009
(Continued)

OTHER PUBLICATIONS

Extended European Search Report for Application No. 17841856.2 dated Feb. 19, 2020.
(Continued)

*Primary Examiner* — Edwin A. Leon
(74) *Attorney, Agent, or Firm* — Merchant & Gould P.C.

(57) ABSTRACT

A telecommunications patch panel system (10) including a plurality of multiport telecommunications bezel assemblies (200) installed within a panel frame (100) is presented. The bezel assemblies (200) are formed from cooperating first and second frame parts (210, 240) to define a plurality of jack receptacle openings (202). In one example, the plurality of jack receptacles (202) are arranged in a two-row array. The first and second frame parts (210, 240) also retain a central bonding strip (290) having a plurality of grounding contact elements (292, 293). The grounding contact elements (292, 293) ground the jack modules (120) that are installed within the bezel assembly jack receptacle openings (202). Where a two-row array of jack receptacle openings (202) is provided, the central bonding strip (290) can be configured to extend between the rows. The central bonding strip (290) can provide grounding for multiple bezel assemblies (200).

12 Claims, 16 Drawing Sheets

Related U.S. Application Data

(60) Provisional application No. 62/521,885, filed on Jun. 19, 2017.

(51) Int. Cl.
    *H01R 13/518* (2006.01)
    *H01R 13/10* (2006.01)

(58) Field of Classification Search
    CPC .............. H01R 13/659; H01R 13/745; H01R 13/6583; H01R 13/506; H01R 24/64
    See application file for complete search history.

(56) References Cited

U.S. PATENT DOCUMENTS

| | | | |
|---|---|---|---|
| 3,830,957 A | 8/1974 | Oberdiear | |
| 4,284,316 A | 8/1981 | Debaigt | |
| 4,537,458 A | 8/1985 | Worth | |
| 4,660,912 A | 4/1987 | Tomek | |
| 4,679,879 A | 7/1987 | Triner et al. | |
| 4,721,476 A | 1/1988 | Zeliff et al. | |
| 4,747,785 A | 5/1988 | Roberts et al. | |
| 4,760,215 A | 7/1988 | Cook et al. | |
| 4,790,765 A | 12/1988 | Ehrenfels et al. | |
| 4,810,210 A | 3/1989 | Komatsu | |
| 4,824,400 A | 4/1989 | Spinner | |
| 4,830,628 A | 5/1989 | Dyson et al. | |
| 4,842,553 A | 6/1989 | Ingram | |
| 4,857,015 A | 8/1989 | Michaels et al. | |
| 5,021,610 A | 6/1991 | Roberts | |
| 5,169,346 A | 12/1992 | Johnston | |
| 5,238,416 A | 8/1993 | Dickie | |
| 5,240,436 A | 8/1993 | Bradley et al. | |
| 5,278,352 A | 1/1994 | Schade | |
| 5,310,359 A | 5/1994 | Chadbourne et al. | |
| 5,445,538 A | 8/1995 | Rodrigues et al. | |
| 5,571,023 A | 11/1996 | Anthony | |
| 5,675,126 A | 10/1997 | Halvorsen | |
| 5,691,506 A | 11/1997 | Miyazaki et al. | |
| 5,697,806 A | 12/1997 | Whiteman, Jr. et al. | |
| 5,762,517 A | 6/1998 | Abe | |
| 5,769,647 A | 6/1998 | Tulley et al. | |
| 6,015,307 A | 1/2000 | Chiu et al. | |
| 6,077,122 A | 6/2000 | Elkhatib et al. | |
| 6,086,415 A * | 7/2000 | Sanchez ............... | H01R 13/465 439/540.1 |
| 6,244,908 B1 | 6/2001 | Hammond et al. | |
| 6,247,849 B1 | 6/2001 | Liu | |
| 6,254,403 B1 | 7/2001 | Bernardini | |
| 6,292,564 B1 | 9/2001 | Cowan et al. | |
| 6,354,851 B1 | 3/2002 | Bachle | |
| 6,386,915 B1 | 5/2002 | Nelson | |
| 6,394,853 B1 | 5/2002 | Hammond et al. | |
| 6,425,694 B1 | 7/2002 | Szilagyi et al. | |
| 6,520,781 B2 | 2/2003 | Koide et al. | |
| 6,537,104 B1 | 3/2003 | Hagmann et al. | |
| 6,612,750 B1 | 9/2003 | Bull et al. | |
| 6,652,152 B2 | 11/2003 | Yang et al. | |
| 6,702,477 B1 | 3/2004 | Ngo | |
| 6,848,833 B1 | 2/2005 | Kamarauskas et al. | |
| 6,866,541 B2 | 3/2005 | Barker et al. | |
| 6,872,090 B2 | 3/2005 | De Dios Martin | |
| 7,029,182 B2 | 4/2006 | Ngo | |
| 7,033,219 B2 | 4/2006 | Gordon et al. | |
| 7,087,840 B2 | 8/2006 | Herring et al. | |
| 7,112,090 B2 | 9/2006 | Caveney et al. | |
| 7,156,696 B1 | 1/2007 | Montena | |
| 7,207,846 B2 | 4/2007 | Caveney et al. | |
| 7,220,145 B2 | 5/2007 | Denovich et al. | |
| 7,273,383 B1 | 9/2007 | Bennett | |
| 7,329,139 B2 | 2/2008 | Benham | |
| 7,340,146 B2 | 3/2008 | Lampert et al. | |
| 7,384,298 B2 | 6/2008 | Caveney et al. | |
| 7,416,448 B2 | 8/2008 | Gaidosch | |
| 7,476,120 B2 | 1/2009 | Patel et al. | |
| 7,510,421 B2 | 3/2009 | Fransen et al. | |
| 7,621,772 B1 | 11/2009 | Tobey | |
| 7,628,644 B1 | 12/2009 | Peluffo | |
| 7,628,657 B2 | 12/2009 | Martich | |
| 7,637,769 B2 | 12/2009 | Carreras Garcia et al. | |
| 7,645,160 B2 | 1/2010 | Tabel | |
| 7,676,133 B2 | 3/2010 | Lampert et al. | |
| 7,727,013 B1 | 6/2010 | Paynter | |
| 7,766,688 B2 | 8/2010 | Mateo Ferrus et al. | |
| 7,806,721 B2 * | 10/2010 | Herndon ............ | H01R 13/745 439/540.1 |
| 7,819,698 B2 | 10/2010 | Islam | |
| 7,854,624 B1 * | 12/2010 | Pepe .................... | H04Q 1/136 439/489 |
| 7,857,663 B2 | 12/2010 | Chantrell et al. | |
| 7,871,285 B1 | 1/2011 | Tobey et al. | |
| 7,874,865 B2 | 1/2011 | Tobey | |
| 7,909,622 B2 | 3/2011 | Pepe et al. | |
| 7,938,680 B1 | 5/2011 | Hsieh | |
| 7,955,120 B2 | 6/2011 | Patel et al. | |
| 8,057,249 B2 | 11/2011 | Tobey et al. | |
| 8,070,506 B2 | 12/2011 | De Dios Martin et al. | |
| 8,075,344 B2 | 12/2011 | Shih | |
| 8,109,784 B2 | 2/2012 | Patel et al. | |
| 8,241,055 B2 | 8/2012 | Chen | |
| 8,376,786 B2 | 2/2013 | Carreras Garcia et al. | |
| 8,454,383 B2 | 6/2013 | Paynter et al. | |
| 8,747,126 B2 | 6/2014 | Corbett et al. | |
| 8,758,065 B2 | 6/2014 | Fransen et al. | |
| 8,791,374 B1 | 7/2014 | Smith | |
| 8,834,196 B2 | 9/2014 | Duran et al. | |
| 9,022,792 B2 | 5/2015 | Sticker et al. | |
| 9,583,885 B2 | 2/2017 | Ruesca Fernandez | |
| 9,627,827 B2 | 4/2017 | Bragg | |
| 9,640,898 B1 | 5/2017 | Wubbels | |
| 9,768,556 B2 | 9/2017 | Bopp et al. | |
| 9,847,607 B2 | 12/2017 | Bopp et al. | |
| 10,476,212 B2 | 11/2019 | Bopp et al. | |
| 10,522,939 B2 | 12/2019 | Martin | |
| 10,594,088 B2 | 3/2020 | Cupples et al. | |
| 10,651,608 B2 | 5/2020 | White | |
| 10,777,953 B2 | 9/2020 | White et al. | |
| 10,784,640 B2 | 9/2020 | Font Aranega et al. | |
| 10,958,012 B2 | 3/2021 | Martin | |
| 11,356,751 B2 * | 6/2022 | White .................. | H01R 13/518 |
| 2002/0058432 A1 | 5/2002 | Chen et al. | |
| 2002/0119681 A1 | 8/2002 | Follingstad et al. | |
| 2003/0081907 A1 | 5/2003 | Malagrino, Jr. et al. | |
| 2004/0038582 A1 | 2/2004 | Clement | |
| 2004/0229501 A1 | 11/2004 | Caveney et al. | |
| 2005/0103672 A1 | 5/2005 | Peng | |
| 2005/0159036 A1 | 7/2005 | Caveney et al. | |
| 2005/0201071 A1 | 9/2005 | Abughazaleh et al. | |
| 2006/0110986 A1 | 5/2006 | King, Jr. et al. | |
| 2006/0204200 A1 | 9/2006 | Lampert et al. | |
| 2007/0054521 A1 | 3/2007 | John | |
| 2007/0240902 A1 | 10/2007 | Tapper | |
| 2008/0090461 A1 | 4/2008 | Pepe et al. | |
| 2008/0096438 A1 | 4/2008 | Clark et al. | |
| 2008/0102686 A1 | 5/2008 | Carreras Garcia et al. | |
| 2008/0268719 A1 | 10/2008 | Siemon et al. | |
| 2008/0311800 A1 | 12/2008 | Tsai Wu | |
| 2009/0004913 A1 | 1/2009 | Caveney et al. | |
| 2009/0034226 A1 | 2/2009 | Herndon et al. | |
| 2009/0243757 A1 | 10/2009 | Xu et al. | |
| 2009/0258545 A1 | 10/2009 | Pepe et al. | |
| 2009/0274422 A1 | 11/2009 | Henry et al. | |
| 2009/0311904 A1 | 12/2009 | Chen | |
| 2009/0318033 A1 | 12/2009 | Tobey | |
| 2010/0151707 A1 | 6/2010 | AbuGhazaleh et al. | |
| 2010/0216335 A1 | 8/2010 | Cobb | |
| 2010/0255716 A1 | 10/2010 | Frey et al. | |
| 2011/0030343 A1 | 2/2011 | Kiser et al. | |
| 2011/0038581 A1 | 2/2011 | Mudd et al. | |
| 2011/0097924 A1 | 4/2011 | Chen | |
| 2011/0115494 A1 | 5/2011 | Taylor et al. | |
| 2011/0304343 A1 | 12/2011 | Font Aranega et al. | |
| 2012/0196472 A1 | 8/2012 | Fitzpatrick | |
| 2012/0226807 A1 | 9/2012 | Panella et al. | |

(56) References Cited

U.S. PATENT DOCUMENTS

| | | |
|---|---|---|
| 2012/0244736 A1 | 9/2012 | Duran et al. |
| 2012/0244752 A1 | 9/2012 | Patel et al. |
| 2012/0322307 A1 | 12/2012 | Kudo |
| 2013/0203291 A1 | 8/2013 | Sticker et al. |
| 2013/0210264 A1 | 8/2013 | Rynaski et al. |
| 2013/0217249 A1 | 8/2013 | Patel et al. |
| 2013/0260582 A1 | 10/2013 | White |
| 2014/0080354 A1 | 3/2014 | Caveney et al. |
| 2014/0242855 A1 | 8/2014 | Kan et al. |
| 2014/0287609 A1 | 9/2014 | Fransen et al. |
| 2014/0335726 A1 | 11/2014 | Zhang |
| 2015/0349468 A1 | 12/2015 | Singer et al. |
| 2016/0080836 A1 | 3/2016 | Carreras Garcia |
| 2016/0248197 A1 | 8/2016 | Fransen et al. |
| 2016/0285205 A1 | 9/2016 | Ruesca Fernandez |
| 2017/0229825 A1* | 8/2017 | Baines ............... H01R 13/514 |
| 2017/0302040 A1 | 10/2017 | Taylor et al. |
| 2018/0287312 A1 | 10/2018 | De Dios Martin et al. |
| 2018/0358739 A1 | 12/2018 | De Dios Martin |
| 2020/0244003 A1 | 7/2020 | De Dios Martin |
| 2020/0267862 A1 | 8/2020 | Taguchi et al. |
| 2020/0351573 A1 | 11/2020 | Shih |
| 2021/0104850 A1 | 4/2021 | White et al. |
| 2021/0143600 A1 | 5/2021 | Font Aranega et al. |
| 2021/0281009 A1 | 9/2021 | De Dios Martin |

FOREIGN PATENT DOCUMENTS

| | | |
|---|---|---|
| CN | 201303074 Y | 9/2009 |
| CN | 201741918 U | 2/2011 |
| CN | 201774068 U | 3/2011 |
| CN | 202025948 U | 11/2011 |
| CN | 102957034 A | 3/2013 |
| CN | 203218574 U | 9/2013 |
| CN | 103384042 A | 11/2013 |
| DE | 101 13 230 A1 | 9/2002 |
| EP | 0 073 112 A1 | 3/1983 |
| EP | 0 775 845 A2 | 5/1997 |
| EP | 1 189 085 A2 | 3/2002 |
| EP | 1 422 793 A1 | 5/2004 |
| EP | 1 443 608 A2 | 8/2004 |
| EP | 1 484 824 A2 | 12/2004 |
| EP | 2 133 957 A1 | 12/2009 |
| ES | 2 178 813 T3 | 1/2003 |
| ES | 2 257 514 T3 | 8/2006 |
| ES | 1 138 538 U | 4/2015 |
| ES | 2 583 636 A1 | 9/2016 |
| ES | 2 584 539 A1 | 9/2016 |
| ES | 2 600 968 A1 | 2/2017 |
| FR | 2 701 007 A1 | 8/1994 |
| FR | 2 893 454 A1 | 5/2007 |
| GB | 221 872 | 9/1924 |
| GB | 2 260 660 A | 4/1993 |
| GB | 2 308 508 A | 6/1997 |
| GB | 2 457 982 A | 9/2009 |
| GB | 2 469 123 A | 10/2010 |
| JP | 2001-244029 A | 9/2001 |
| JP | 2006-126807 A | 5/2006 |
| JP | 2007-299620 A | 11/2007 |
| JP | 2007-313060 A | 12/2007 |
| JP | 2013-235783 A | 11/2013 |
| KR | 2001-0100594 A | 11/2001 |
| KR | 20-2010-0008888 U | 9/2010 |
| TW | M349117 U | 1/2009 |
| WO | 95/34923 A1 | 12/1995 |
| WO | 97/44862 A1 | 11/1997 |
| WO | 99/19944 A1 | 4/1999 |
| WO | 03/026076 A1 | 3/2003 |
| WO | 2005/104300 A1 | 11/2005 |
| WO | 2008/059203 A2 | 5/2008 |
| WO | 2008/095830 A1 | 8/2008 |
| WO | 2011/038387 A1 | 3/2011 |
| WO | 2013/090201 A1 | 6/2013 |
| WO | 2013/096279 A1 | 6/2013 |
| WO | 2013/123154 A1 | 8/2013 |
| WO | 2014/167449 A1 | 10/2014 |
| WO | 2016/151172 A1 | 9/2016 |
| WO | 2016/151177 A1 | 9/2016 |
| WO | 2016/156643 A1 | 10/2016 |
| WO | 2016/156644 A1 | 10/2016 |
| WO | 2018/009698 A1 | 1/2018 |
| WO | 2018/034870 A1 | 2/2018 |
| WO | 2018/236875 A1 | 12/2018 |
| WO | 2019/094558 A1 | 5/2019 |

OTHER PUBLICATIONS

Extended European Search Report for Application No. 18820793.0 dated Feb. 12, 2021.
Extended European Search Report for Application No. 18875839.5 dated Jul. 19, 2021.
Extended European Search Report for Application No. 2017844.9 dated Aug. 24, 2020.
First Office Action for Chinese Patent Application No. 201880072621.7 dated Aug. 17, 2021, 21 pages.
International Search Report and Written Opinion for Application No. PCT/ES2016/070204 mailed Jun. 6, 2016.
International Search Report and Written Opinion for Application No. PCT/ES2016/070212 mailed Jun. 2, 2016.
International Search Report and Written Opinion for Application No. PCT/ES2016/070213 mailed Jun. 7, 2016.
International Search Report and Written Opinion for Application No. PCT/ES2016/070190 mailed Jul. 5, 2016.
International Search Report and Written Opinion for Application No. PCT/EP2016/069310 mailed Oct. 14, 2016.
International Search Report and Written Opinion for Application No. PCT/US2017/040947 mailed Oct. 13, 2017.
International Search Report and Written Opinion for Application No. PCT/US2017/045539 mailed Nov. 15, 2017.
International Search Report and Written Opinion of the International Searching Authority for International Patent Application No. PCT/US2018/038295 dated Oct. 16, 2018, 11 pages.
International Search Report and Written Opinion of the International Searching Authority for International Patent Application No. PCT/US2018/059780 dated Mar. 4, 2019, 12 pages.
"Mini-Com All Metal Shielded Modular Patch Panels, Installation Instructions", Panduit, 2 pages (2010).
"Mini-Com® All Metal Shielded Modular Patch Panels, Installation Instructions, Specification Sheet", Panduit, 3 pages (2016).
Product Specifications: 1-1479191-3, SL Series Speaker Post Insert, red stripe, alpine white, CommScope, Inc., 1 page (Sep. 6, 2017).
State of the Art Report for Application No. 201530372 mailed Mar. 20, 2015.
State of the Art Report for Application No. 201530377 mailed Mar. 23, 2015.
State of the Art Report for Application No. 201530417 mailed Mar. 27, 2015.
State of the Art Report for Application No. 201530418 mailed Mar. 27, 2015.
State of the Art Report for Application No. 201530419 mailed Mar. 27, 2015.
State of the Art Report for Application No. 201531199 mailed Aug. 13, 2015.

* cited by examiner

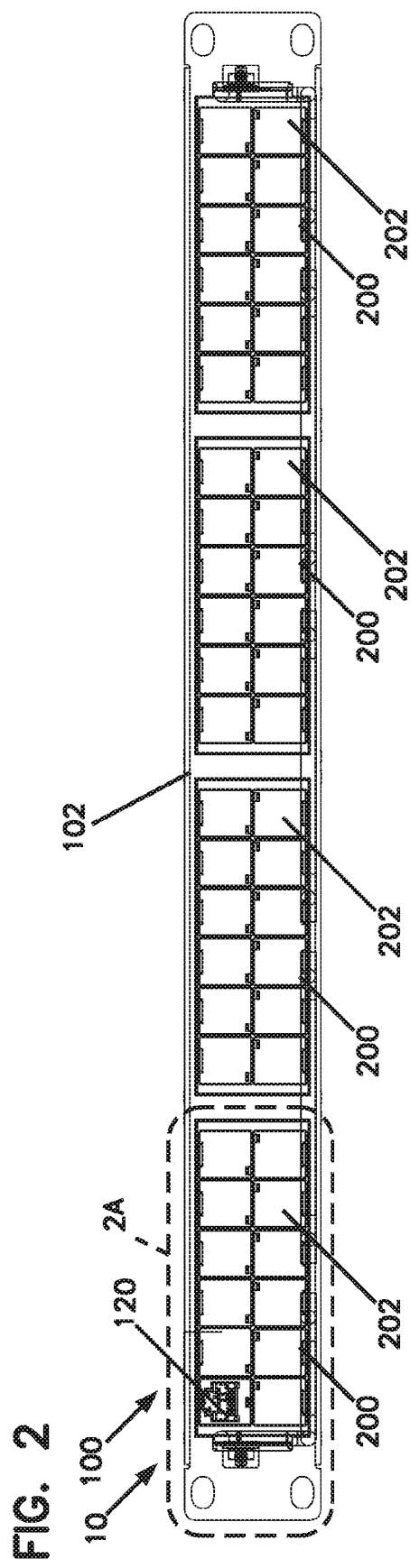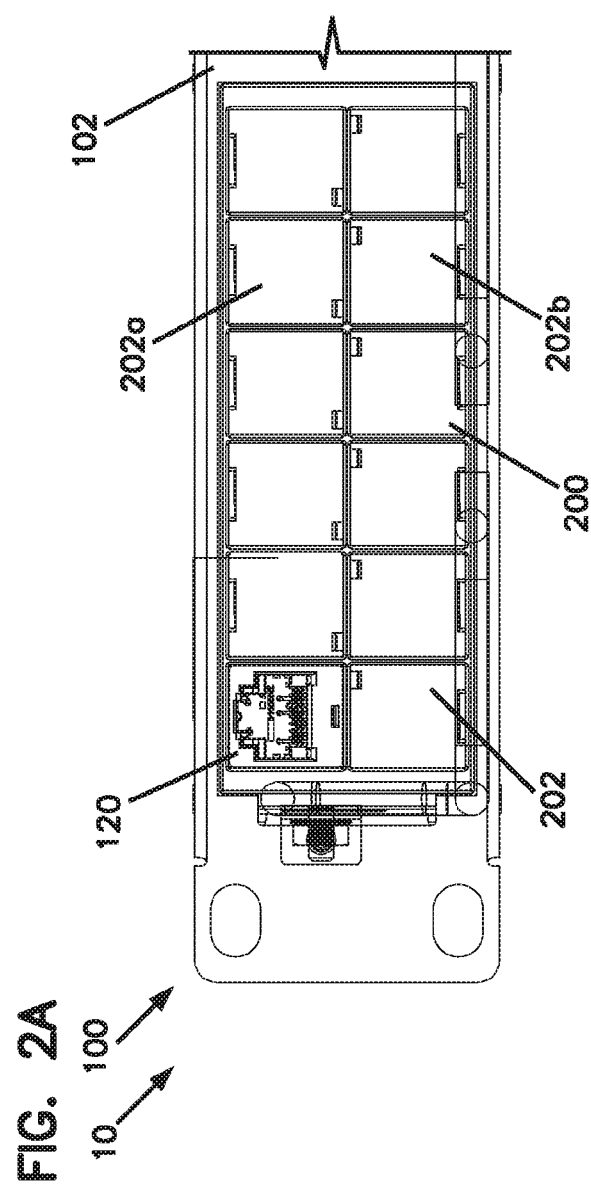

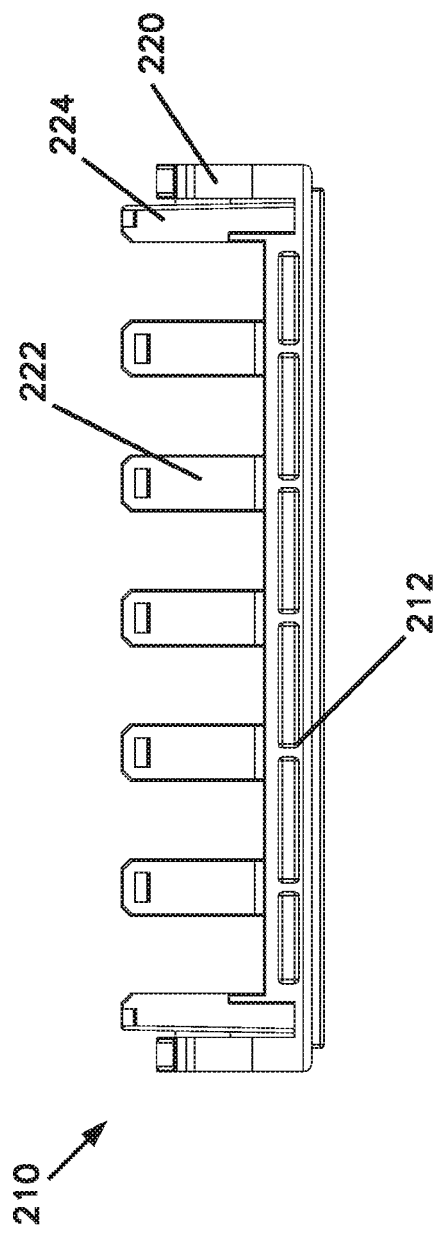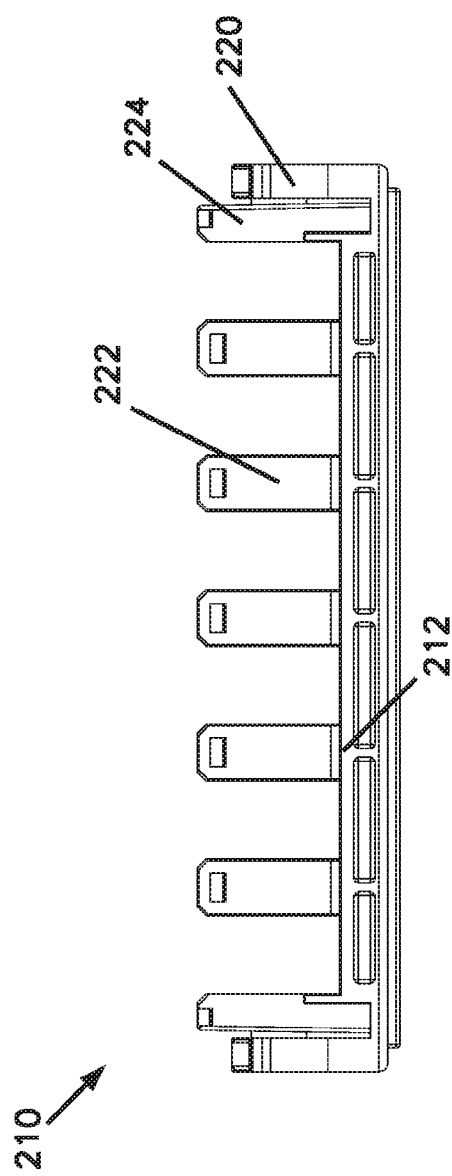

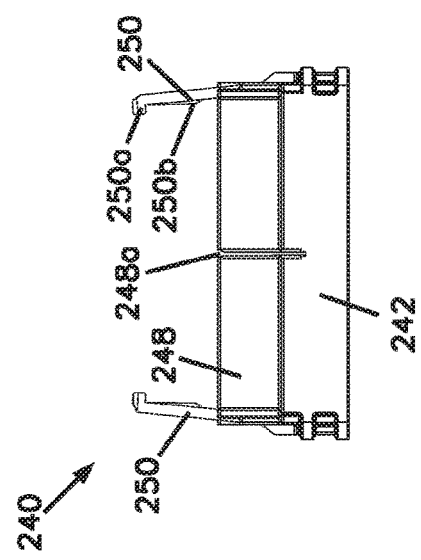
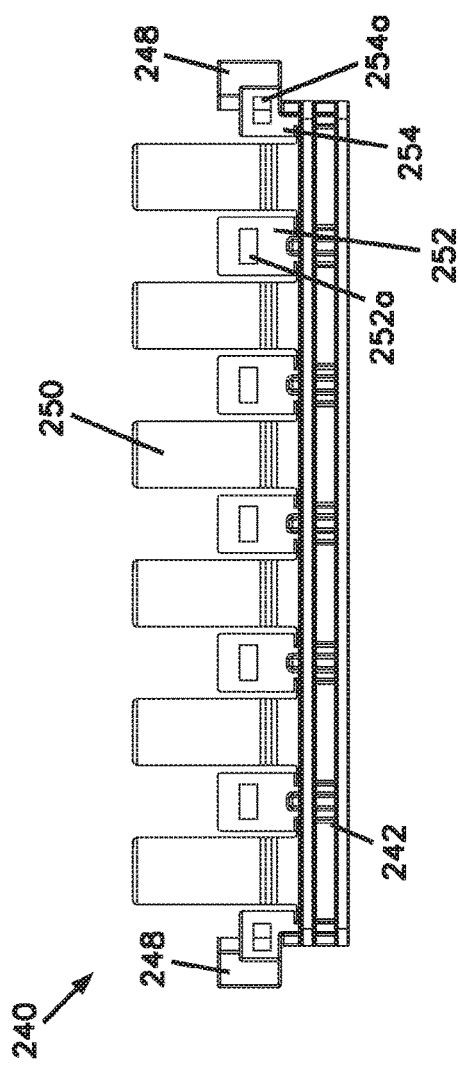
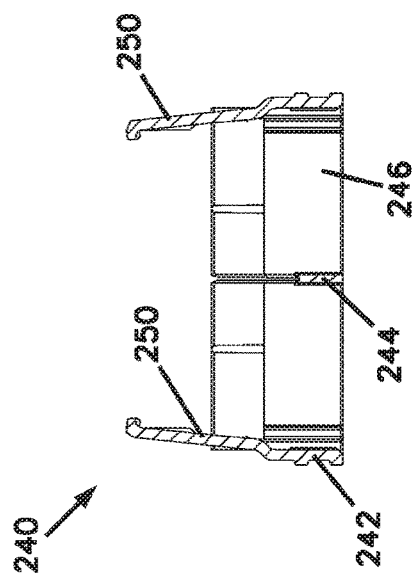

HIGH DENSITY BEZEL FOR PATCH PANEL

CROSS-REFERENCE TO RELATED APPLICATION

This application is a Continuation of U.S. patent application Ser. No. 16/624,432, filed on Dec. 19, 2019, now U.S. Pat. No. 11,356,751, which is a National Stage Application of PCT/US2018/038295, filed on Jun. 19, 2018, which claims the benefit of U.S. Patent Application Ser. No. 62/521,885, filed on Jun. 19, 2017, the disclosures of which are incorporated herein by reference in their entireties. To the extent appropriate, a claim of priority is made to each of the above disclosed applications.

BACKGROUND

Patch panels are commonly used to enable inter-connection or cross-connection between telecommunications equipment. A typical patch panel includes a cable termination interface (e.g., optical adapters, electrical jacks, etc.) to connect one or more patch cables to respective connector elements. Additionally, patch panels can include fixtures to facilitate cable management and organization. Patch panels that provide more effective and/or efficient methods for cable termination and management are desired.

SUMMARY

In accordance with some aspects of the disclosure, a telecommunications patch panel system including a plurality of multiport telecommunications bezel assemblies installed within a panel frame is shown and described. The panel frame can define one or more frame openings. Each of the bezel assemblies is secured to the panel frame and extends through one of the frame openings. Each of the bezel assemblies can include a first frame part and a second frame part. In one aspect, first frame part defines a first peripheral wall and at least one first interior wall. In one aspect, the second frame part defines a second peripheral wall and at least one second interior wall. The second frame part is secured to the first frame part such that the first and second peripheral walls and the at least one first and second interior walls define a two-row array of a plurality of jack receptacle openings extending from a rear open end to a front open end. The patch panel system can also include a metal bonding strip extending through each of the bezel assemblies. The metal bonding strip can be secured between the front and first frame parts of each of the plurality of bezel assemblies. The bonding strip including a plurality of grounding contact elements extending into each of the plurality of jack receptacle openings.

In one example, a multiport telecommunications bezel assembly is disclosed including a first frame part defining a first peripheral wall and at least one first interior wall and a second frame part defining a second peripheral wall and at least one second interior wall. In one aspect, the second frame part can be secured to the first frame part such that the first and second peripheral walls and the at least one first and second interior walls define a two-row array of a plurality of jack receptacle openings extending from a first open end to a second open end. The bezel assembly can also include a metal bonding strip secured between the first and second frame parts, the bonding strip including a plurality of grounding contact elements extending into each of the plurality of jack receptacle openings.

In one example, a multiport telecommunications bezel assembly is disclosed including a first frame part defining a first peripheral wall and at least one first interior wall and a second frame part defining a second peripheral wall and at least one second interior wall. In one aspect, the second frame part can be secured to the first frame part such that the first and second peripheral walls and the at least one first and second interior walls define a plurality of jack receptacle openings extending from a rear open end to a front open end. The bezel assembly can also include a metal bonding strip secured between the front and first frame parts, the bonding strip including a plurality of grounding contact elements extending into each of the plurality of jack receptacle openings and a plurality of jack modules inserted into at least some of the plurality of jack receptacle openings.

In one example, a multiport telecommunications bezel assembly is disclosed that includes a panel frame defining a plurality of openings, a plurality of bezel frame assemblies; each of which being secured within one of the plurality of panel frame openings, wherein each of the plurality of bezel frame assemblies defines a plurality of jack receptacle openings; and a metal bonding strip secured between the plurality of bezel frame assemblies, the bonding strip including a plurality of grounding contact elements extending into each of the plurality of jack receptacle openings. In some examples, the plurality of jack receptacle openings is a two-row array of jack receptacle openings. In some examples, the metal bonding strip passes between an upper row of jack receptacle openings and a lower row of jack receptacle openings. In some examples, the plurality of bezel frame materials are formed from a polymeric material.

In some examples, each bezel assembly defines apertures sized to fit any of a plurality of types of jack modules. For example, or example RJ-type jack modules.

In some examples, the first frame part includes a plurality of latches for removably securing jacks within the plurality of jack receptacle openings.

In some examples, a rack panel to which the second frame part is secured is provided. In some examples, the rack panel has a 1 U rack height.

In some examples, a plurality of jacks is inserted into the plurality of jack receptacle openings.

In some examples, each of the plurality of jacks can be inserted into one of the plurality of jack receptacle openings from the rear open end.

In some examples, each of the plurality of jacks can be inserted into one of the plurality of jack receptacle openings from the rear open end.

In some examples, a panel frame is provided to which the second frame part is secured.

In some examples, the first frame part includes a plurality of latches for removably securing the jacks within the plurality of jack receptacle openings.

In some examples, a telecommunications panel is provided including a panel frame defining a frame opening and a bezel assembly according to any of the aforementioned examples installed into the panel frame opening. In some examples, the panel frame includes a plurality of frame openings.

In some examples, the at least one multiport telecommunications bezel assembly includes a plurality of multiport telecommunications bezel assemblies secured to the panel frame. In some examples, each of the multiport telecommunications bezel assemblies includes 12 jack receptacle openings.

In some examples, the plurality of telecommunications bezel assemblies includes four telecommunications bezel assemblies.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 2 is a front view of the patch panel system shown in FIG. 1, the patch panel being in an assembled configuration.

FIG. 2A is an enlarged front view of a portion of the assembled patch panel shown in FIG. 2, as indicated at FIG. 2.

FIG. 13 is a top view of the first frame part shown in FIG. 9.

FIG. 14 is a bottom view of the first frame part shown in FIG. 9.

FIG. 22 is a top view of the second frame part shown in FIG. 18.

FIG. 23 is a first side view of the second frame part shown in FIG. 18.

FIG. 24 is a cross-sectional side view of the second frame part shown in FIG. 18.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
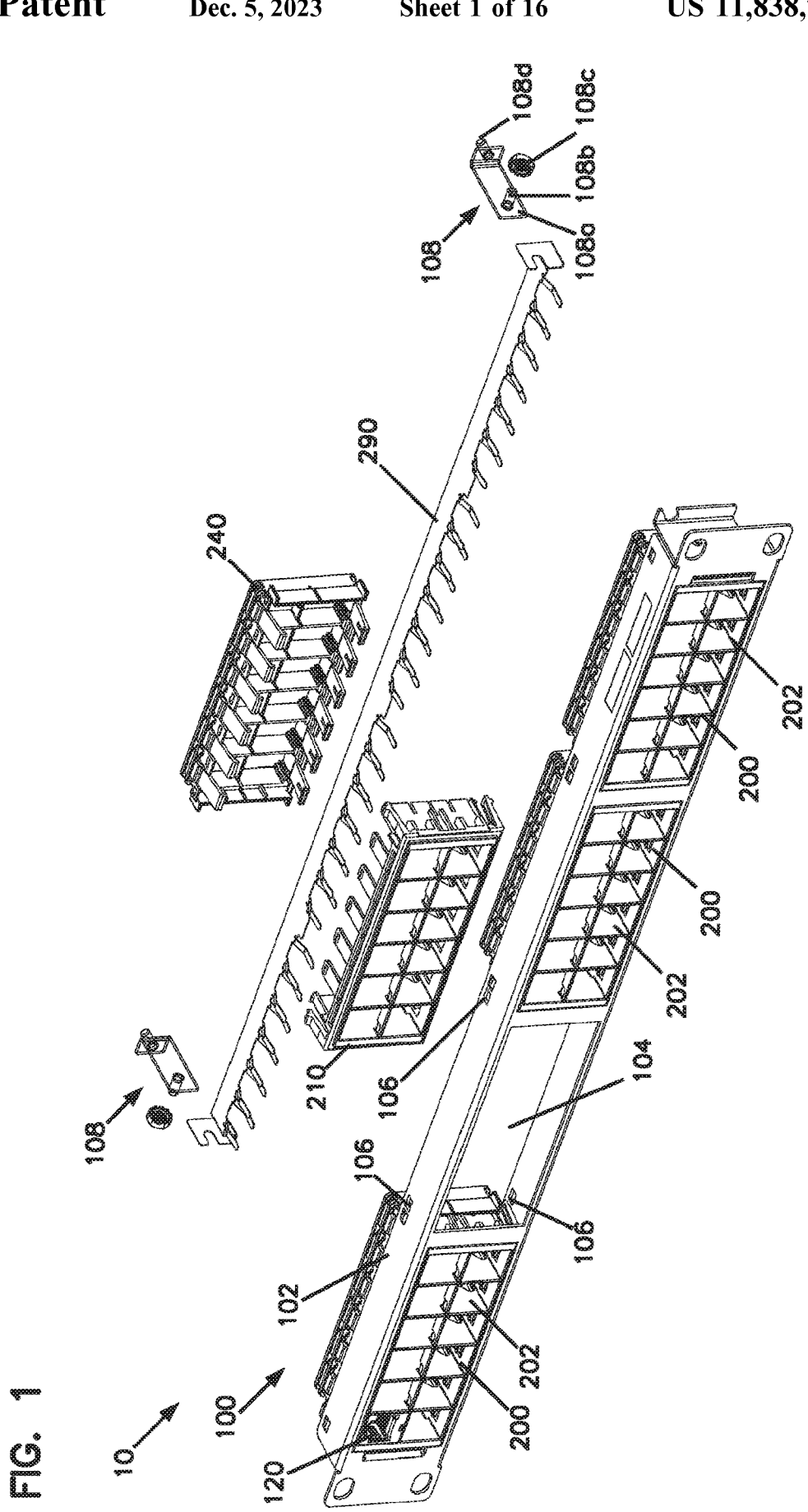
FIG. 1 is a front perspective exploded view of an example patch panel system having four bezel assemblies, with one of the bezel assemblies holding one jack module in accordance with the principles of the present disclosure.
Figure 29:
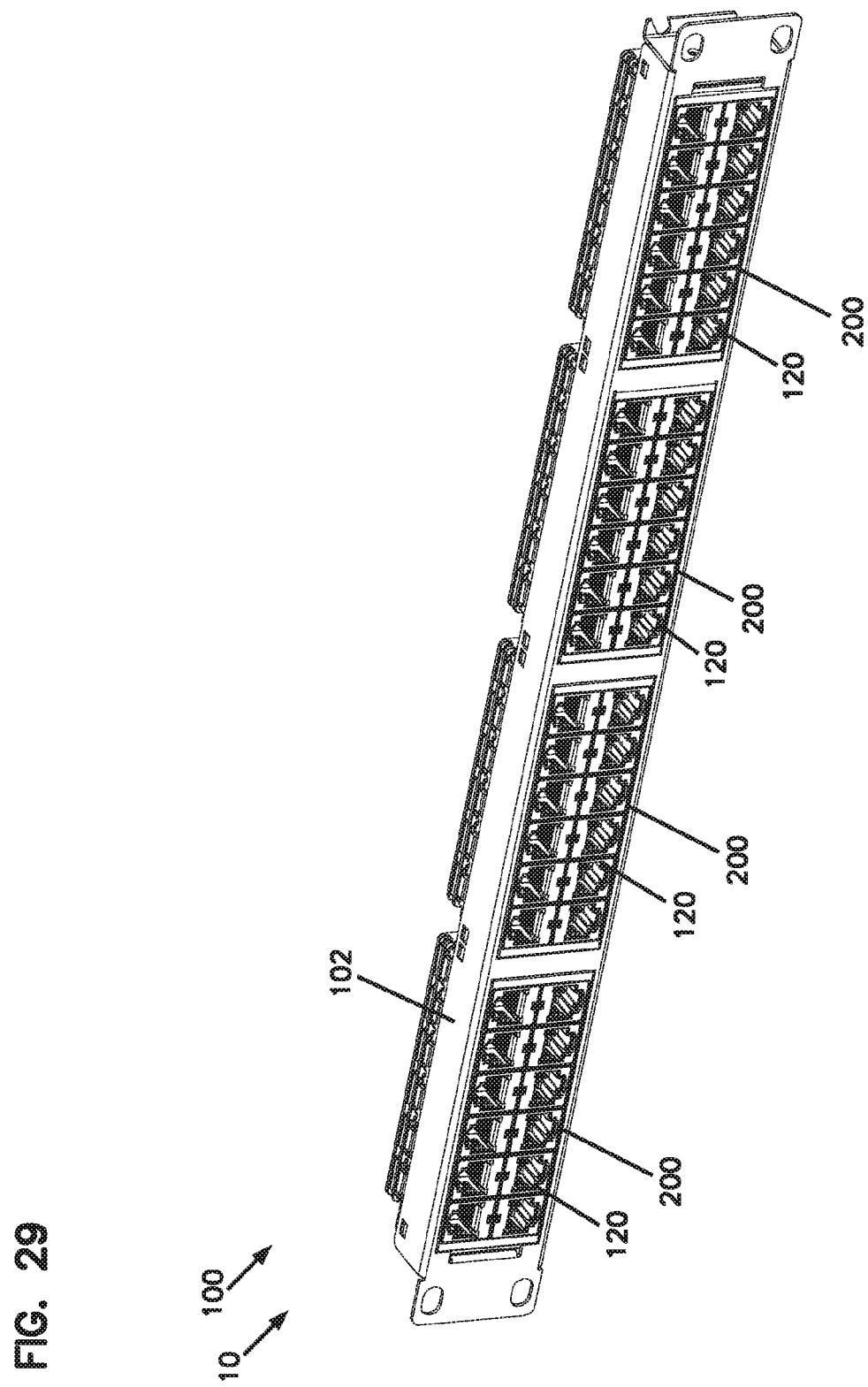
FIG. 29 is a front perspective view of the patch panel system shown in FIG. 1 in an assembled state, with the bezel assemblies being fully loaded with jack modules.
Figure 30:
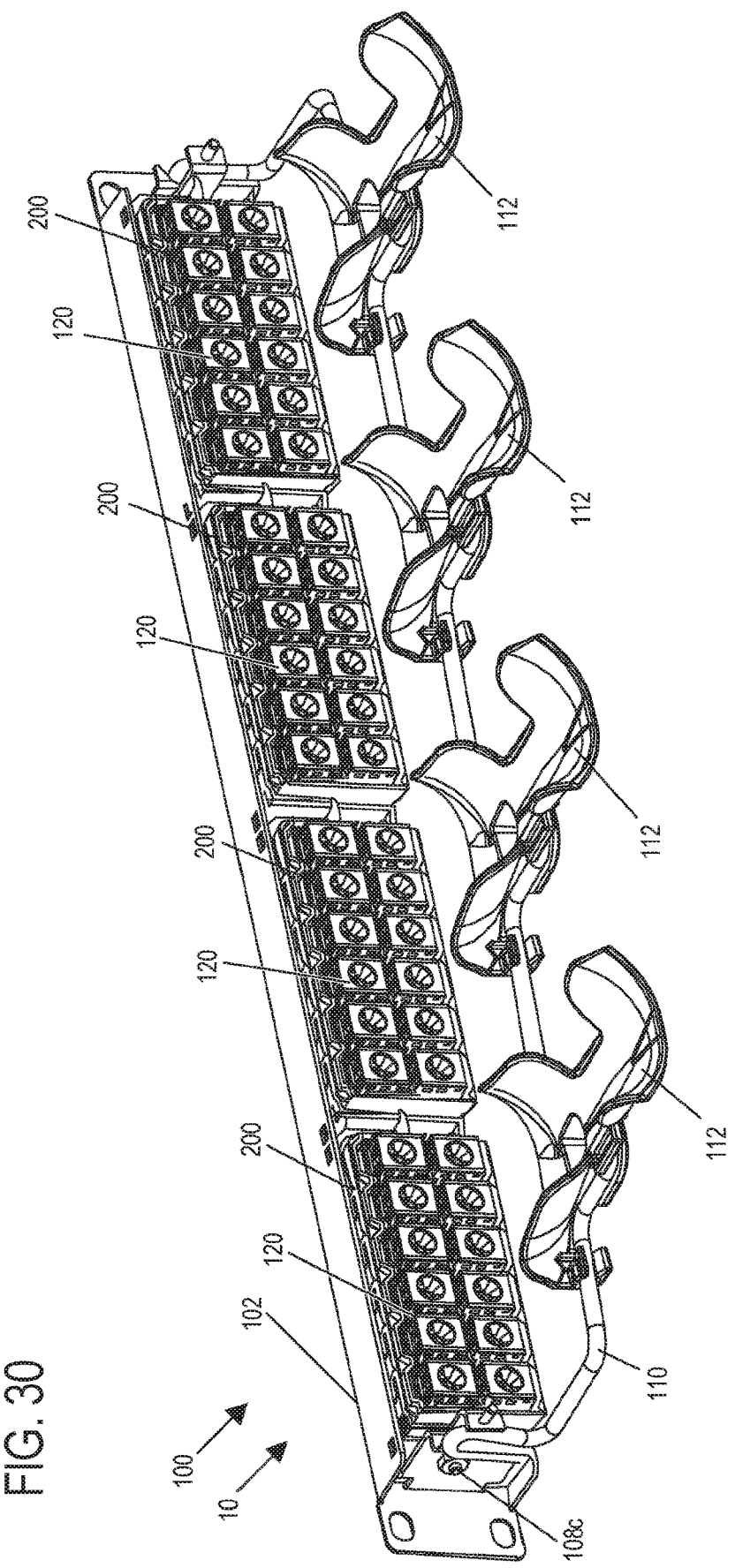
FIG. 30 is a rear perspective view of the patch panel system shown in FIG. 1 with additional cable management features being shown.

Referring to FIGS. 1 and 29-30, the present disclosure relates to a patch panel system 10 including one or more jack modules 120 configured to mount to a patch panel 100 including multiple bezel assemblies 200. The patch panel 100 includes a frame member 102 defining a plurality of apertures 104 for receiving the bezel assemblies 200. The frame member 102 is additionally shown as including a plurality of apertures 106 for receiving latching members of the bezel assemblies 200 such that the bezel assemblies 200 can be secured to the frame member 102 with a snap-fit connection.

Each jack module 120 is configured to hold one or more types of cable termination interfaces. For convenience, the cable termination interfaces disclosure herein will focus on electrical jacks. In other implementations, however, the jack module 120 could hold optical adapters or other media interfaces. In the example shown in FIG. 1, the patch panel 100 is configured to hold four bezel assemblies 200, each being configured to hold 12 jack modules. In other implementations, however, the patch panel 100 can be configured to hold a greater or lesser number of bezel assemblies 200 and the bezel assemblies 200 can be configured to hold a greater or lesser number of jack modules 120 (e.g., two, eight, twelve, sixteen, etc.). The patch panel 100 is configured to mount to a rack, cabinet, or other such structure.

Figure 31:
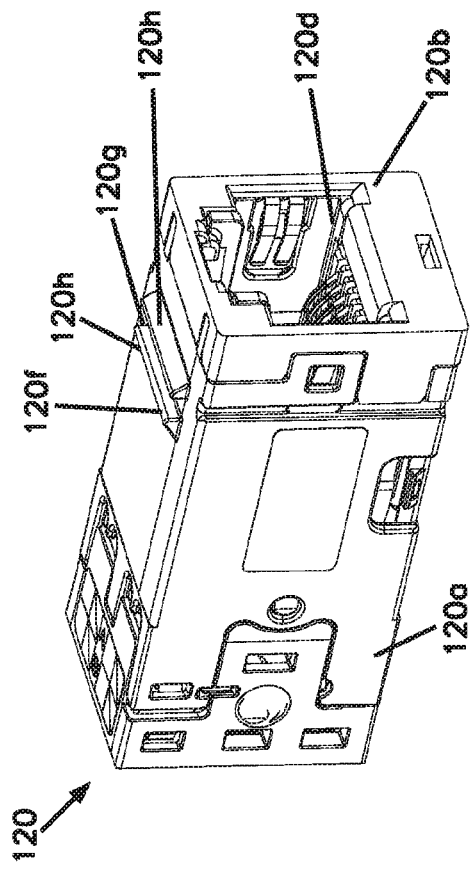
FIG. 31 is a front perspective view of the jack module shown in FIG. 1.
Figure 32:
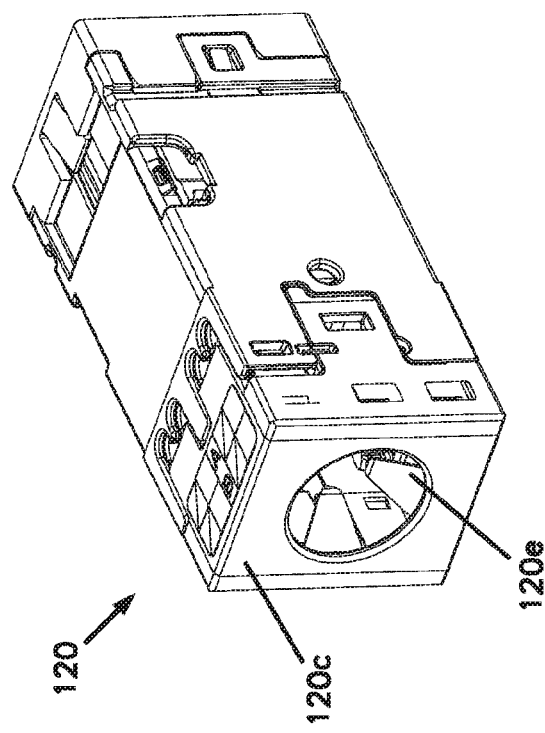
FIG. 32 is a rear perspective view of the jack module shown in FIG. 31.

In some implementations, each bezel assembly 200 defines apertures 202 sized to fit any of a plurality of types of jacks. For example, the frame apertures may be sized to receive jacks of the type shown and described in U.S.

provisional patent application Ser. No. 62/375,269, filed on Aug. 15, 2016; PCT Publication WO 2016/156644, filed on Mar. 26, 2016; and a U.S. Provisional Application No. 62/521,952, filed Jun. 19, 2017, entitled Connector Assembly with Grounding Part. The entireties of U.S. 62/375,269, WO 2016/156644, and U.S. 62/521,952 are incorporated by reference herein. A similar jack module 120 to those in the aforementioned disclosures is shown at FIGS. 31 and 32, wherein the jack module 120 is shown as having a metal main body 120a extending between a front end 120b and a rear end 120c. As shown, a jack receptacle 120d, for example an RJ-type jack receptacle 120d is shown proximate the front end 120b. A grounding feature or element 120e is shown as being proximate the rear end 120c. A connecting or latching feature 120f is shown as being provided on the main body 120a at a location between the front and rear ends 120b, 120c, the latching feature 120f being closer to the front end 120b than the rear end 120c.

A single jack module 120 is shown as being inserted into an aperture 202 at FIGS. 1, 2, 2A, 3, and 4. Two jack modules 120 are shown as being inserted into apertures 202 at FIG. 3A. FIGS. 29 and 30 show a patch panel 100 fully loaded with jack modules 120, wherein four bezel assemblies 200 are each loaded with twelve jack modules 120 for a total of 48 inserted jack modules 120. In other implementations, the frame apertures 202 may be sized to fit other types of jacks and/or optical adapters. For example, the frame apertures 202 may be sized to receive any of the following types of jack modules 120: AMP-TWIST 6S, 6AS, 7AS, SL, and AMP-TWIST 6AUTP, manufactured by CommScope Inc. In other implementations, the frame apertures 202 may be sized to fit other types of electrical jacks 120 and/or optical adapters.

As most easily seen at FIGS. 3-8, each bezel assembly 200 is formed from a first or front frame part 210 and a mating second or rear frame part 240 that cooperatively define the jack receptacle openings 202. In some examples, the frame parts 210, 240 are formed from a polymeric or plastic material (e.g. acrylonitrile butadiene styrene (ABS), polyethylene, polycarbonate, polyamide, polystyrene, polypropylene, and polybutylene terephthalate (PBT)). In one aspect, the front frame part 210 is defined by a peripheral wall 212, a first interior wall 214, and a plurality of second interior walls 216. In one aspect, the rear frame part 240 is defined by a peripheral wall 242, a first interior wall 244, and a plurality of second interior walls 246. In the example shown, the peripheral walls 212, 242 and the interior walls define 214, 216, 244, 246 define a two-row array of a plurality of jack receptacle openings 202 extending from a first open end 204 to a second open end 206 with a total of twelve jack receptacle openings 202. In an alternative configuration shown at FIG. 3A, an additional labelling frame 215 may be provided on the front frame part 210. In such a configuration, a labeling card 215a having indicia 215b can be inserted into the labelling frame 215 and retained in place by overhanging members 215c. The first and second frame parts 210, 240 are discussed in greater detail later in this description.

Figure 3:
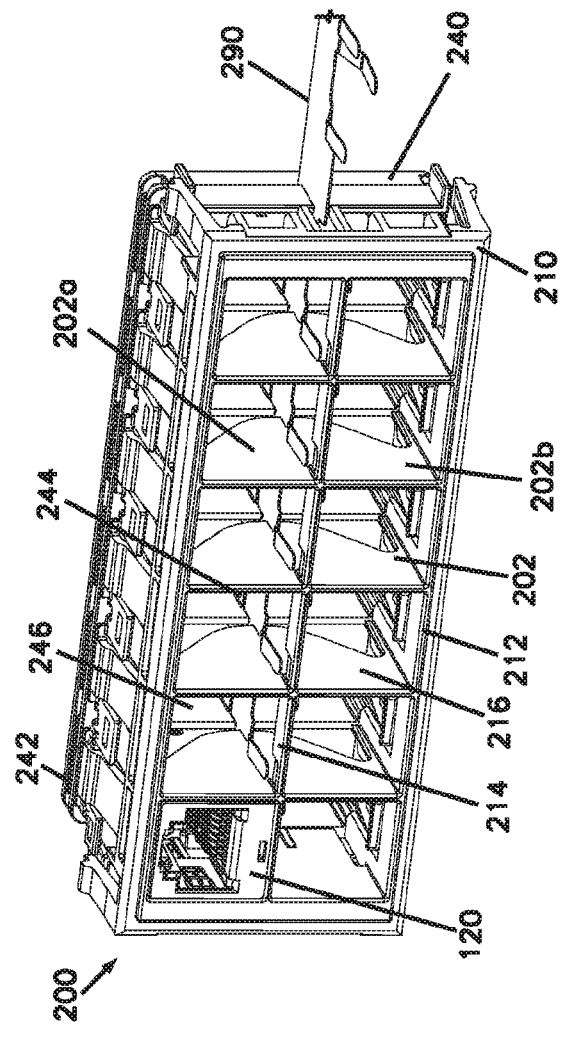
FIG. 3 is a front perspective view of one of the bezel assemblies shown as being a part of the patch panel system shown in FIGS. 1 and 2.
Figure 3A:
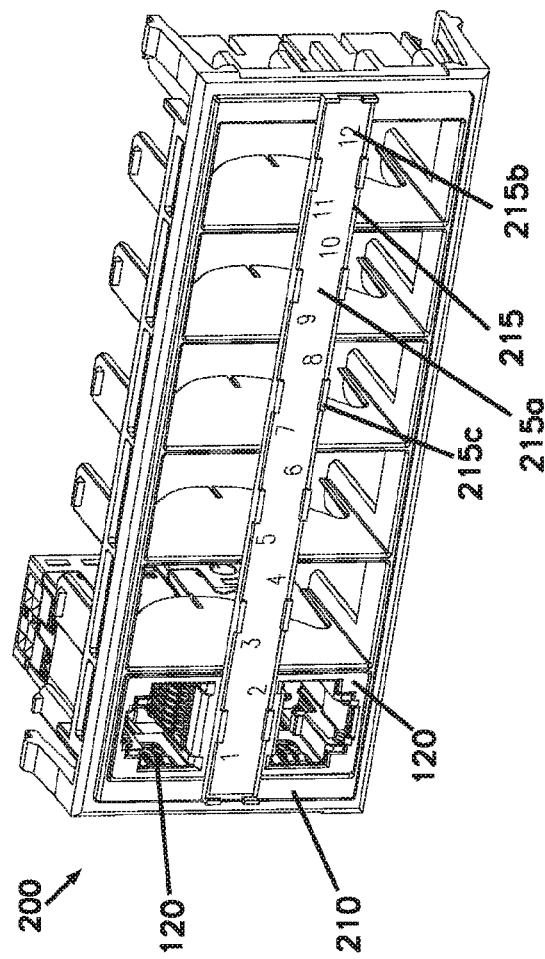
FIG. 3A is a front perspective view of an alternative bezel assembly suitable for use in the patch panel system shown in FIG. 1.
Figure 4:
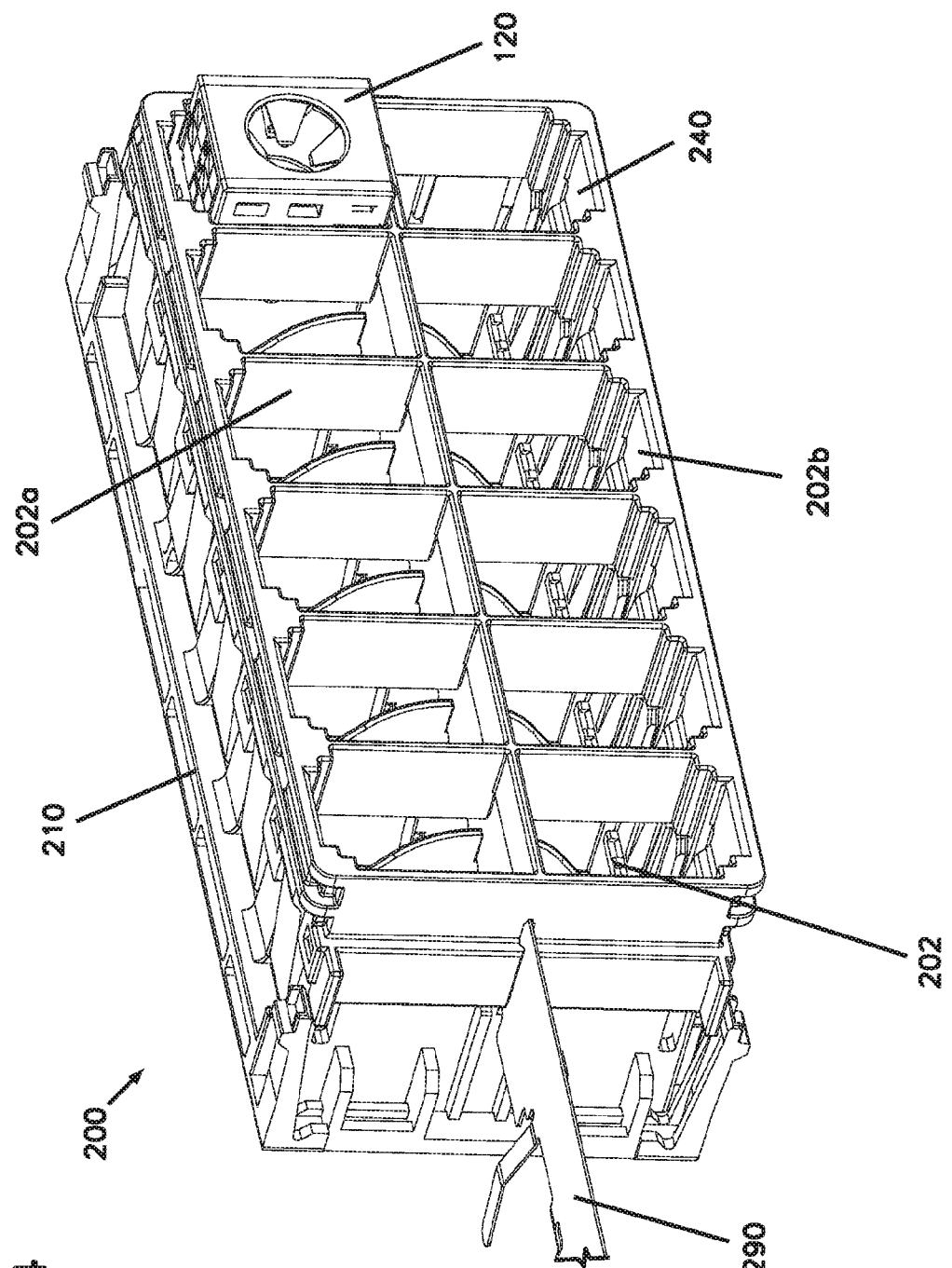
FIG. 4 is a rear perspective view of the bezel assembly shown in FIG. 3.
Figure 5:
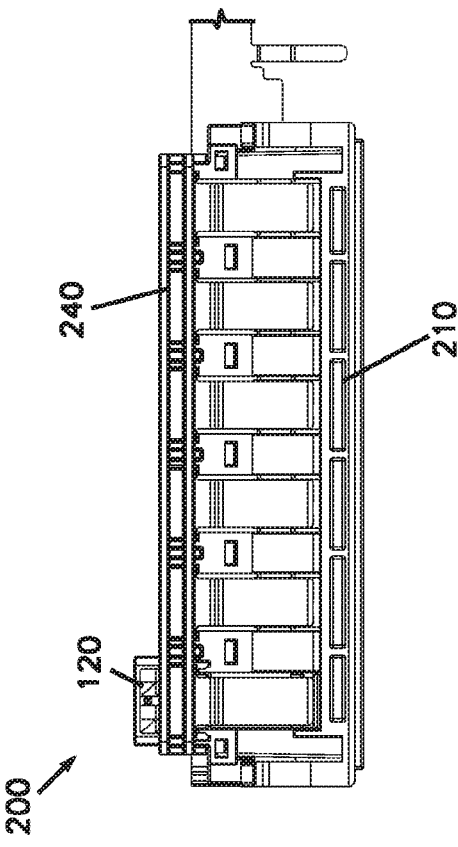
FIG. 5 is a top view of the bezel assembly shown in FIG. 3.
Figure 6:
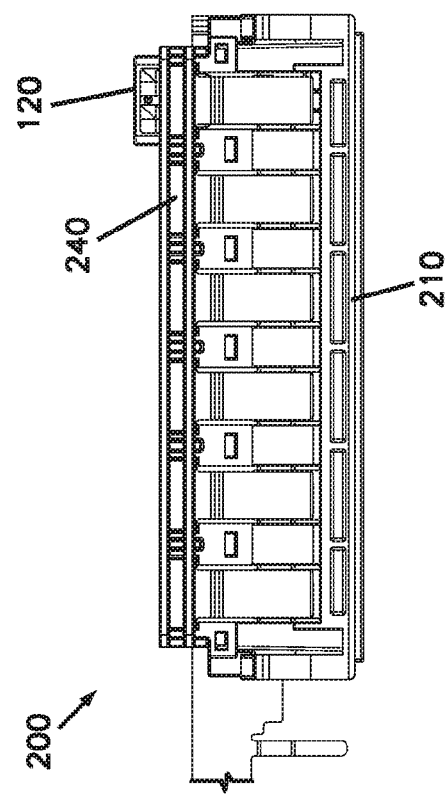
FIG. 6 is a bottom view of the bezel assembly shown in FIG. 3.
Figure 7:
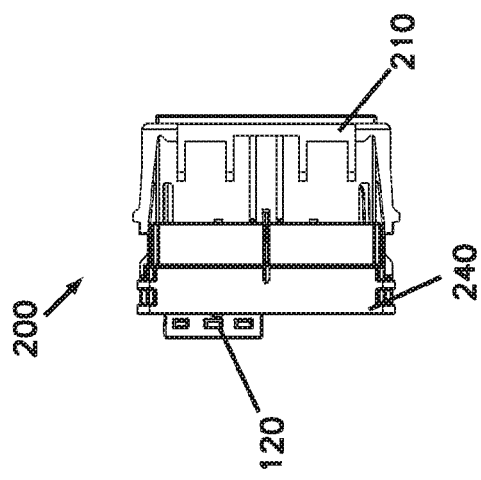
FIG. 7 is a first side view of the bezel assembly shown in FIG. 3.
Figure 8:
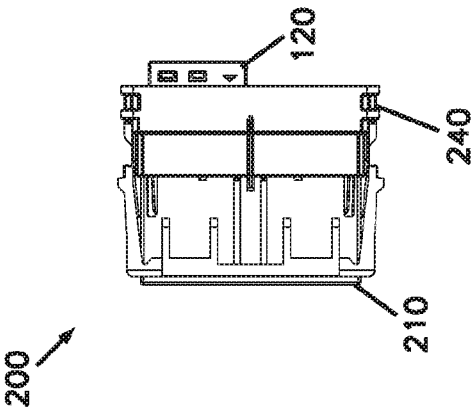
FIG. 8 is a second side view of the bezel assembly shown in FIG. 3.
Figure 10:
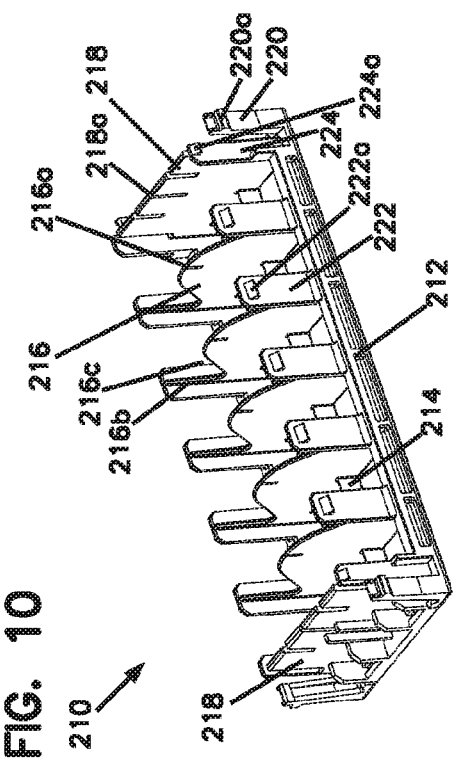
FIG. 10 is a rear perspective view of the first frame part shown in FIG. 9.
Figure 9:
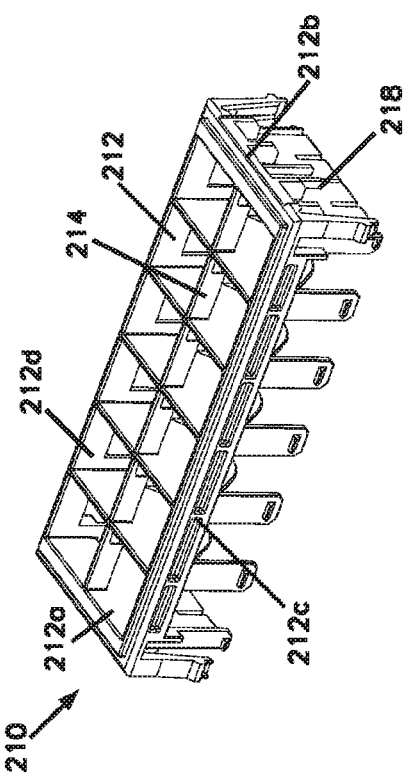
FIG. 9 is a front perspective view of a first frame part of the bezel assembly shown in FIG. 3.
Figure 12:
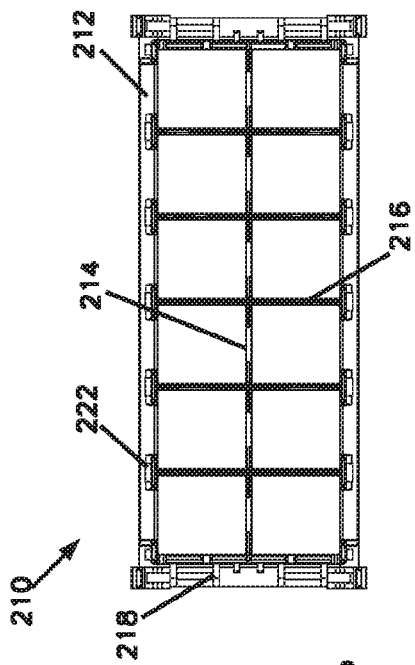
FIG. 12 is a rear view of the first frame part shown in FIG. 9.
Figure 11:
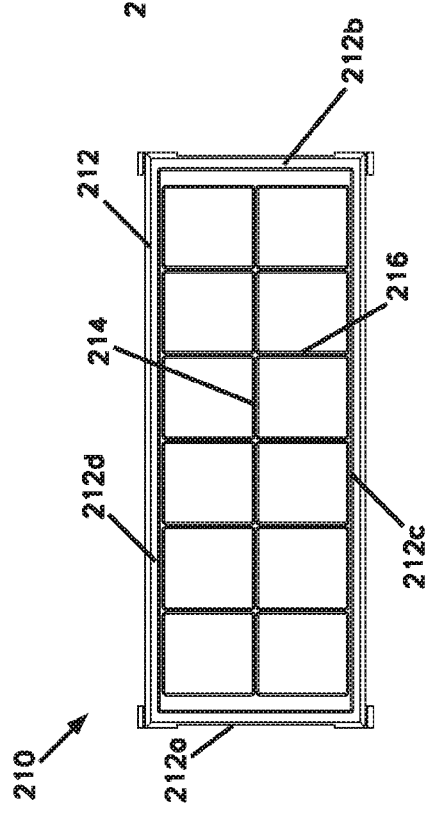
FIG. 11 is a front view of the first frame part shown in FIG. 9.
Figure 16:
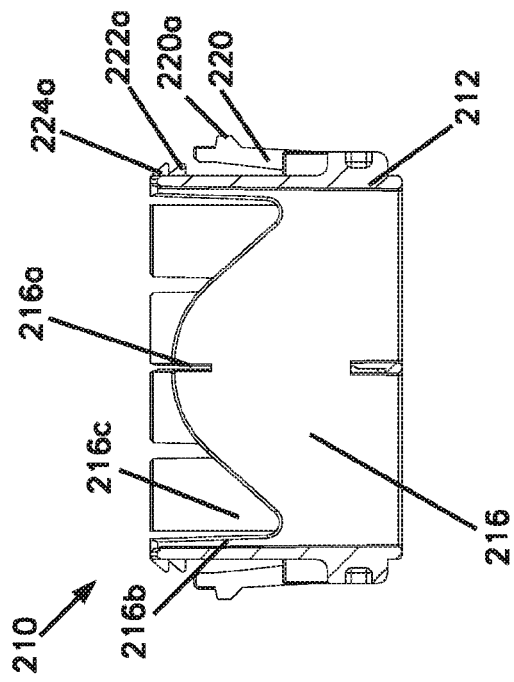
FIG. 16 is a first cross-sectional side view of the first frame part shown in FIG. 9.
Figure 15:
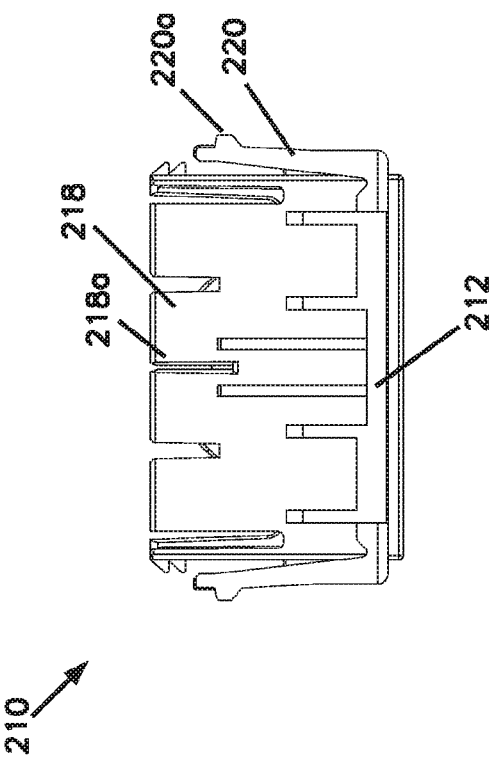
FIG. 15 is a first side view of the first frame part shown in FIG. 9.
Figure 17:
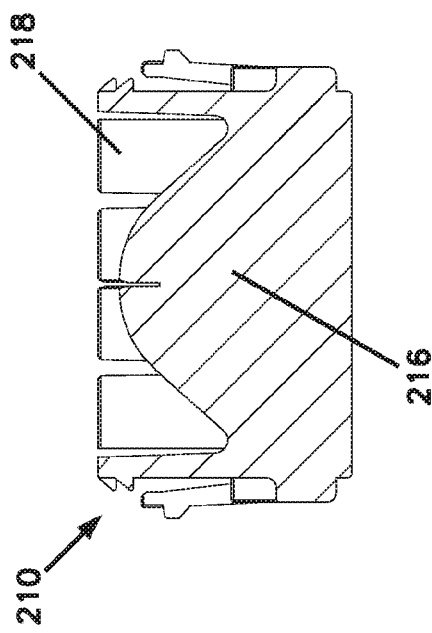
FIG. 17 is a second cross-sectional side view of the first frame part shown in FIG. 9.
Figure 19:
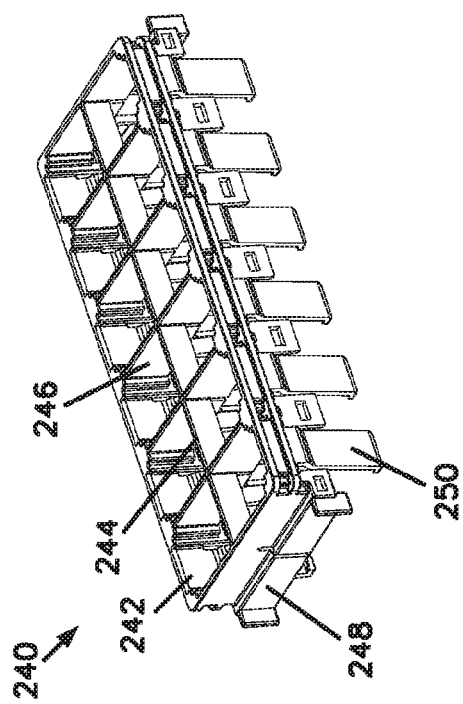
FIG. 19 is a rear perspective view of the second frame part shown in FIG. 18.
Figure 18:
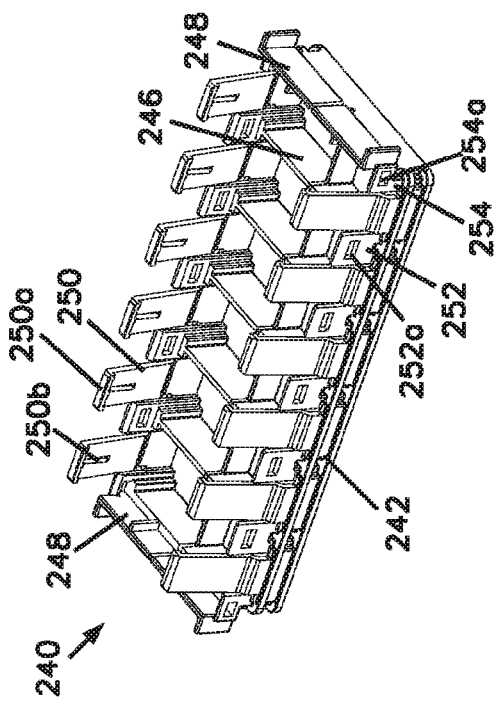
FIG. 18 is a front perspective view of a second frame part of the bezel assembly shown in FIG. 3.
Figure 21:
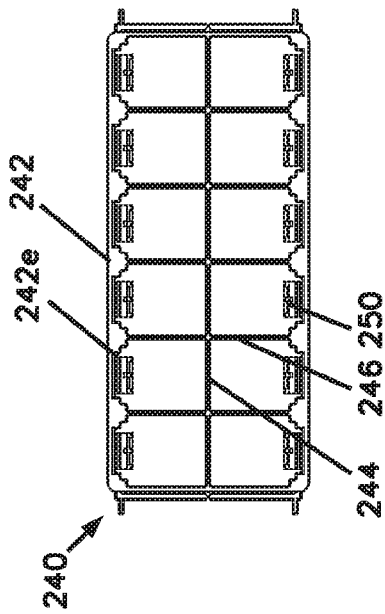
FIG. 21 is a front view of the second frame part shown in FIG. 18.
Figure 20:
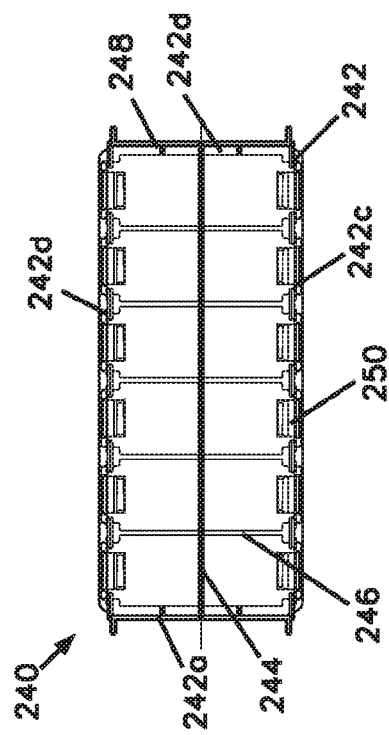
FIG. 20 is a rear view of the second frame part shown in FIG. 18.
Figure 25:
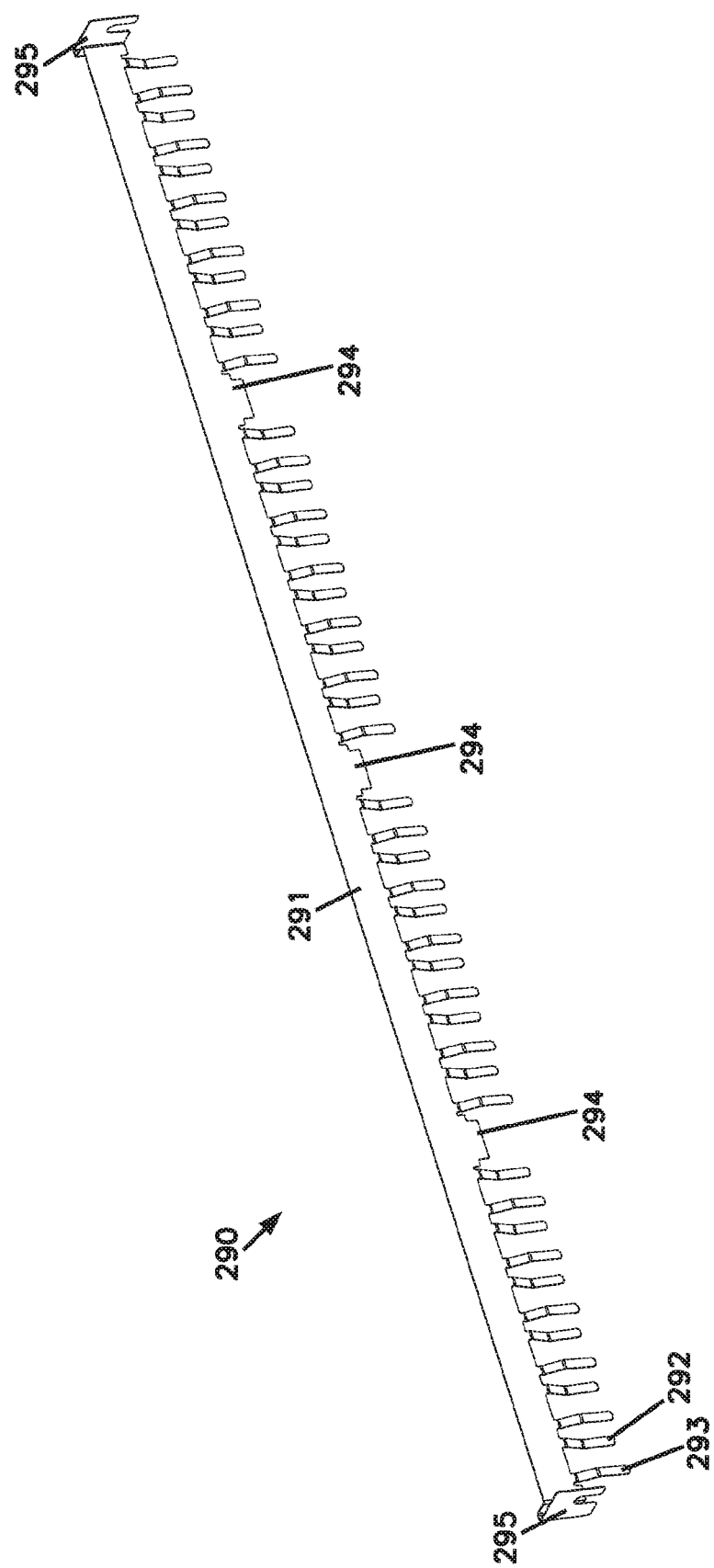
FIG. 25 is a front perspective view of a bonding strip of the patch panel system shown in FIG. 1.
Figure 26:
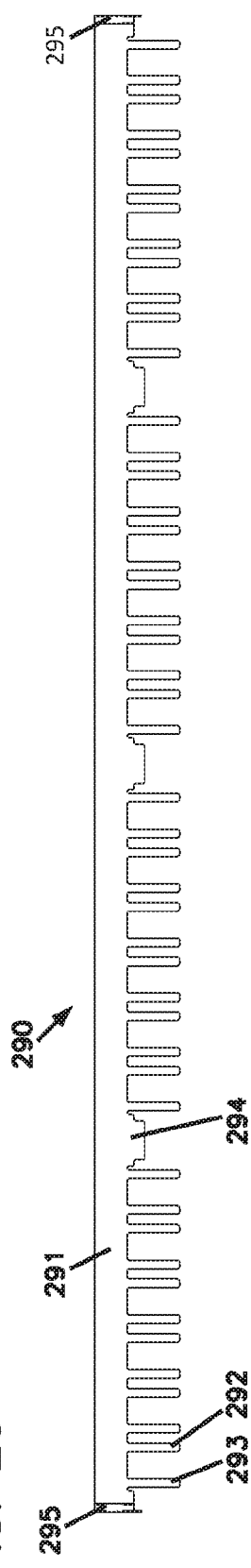
FIG. 26 is a top view of the bonding strip shown in FIG. 25.
Figure 27:
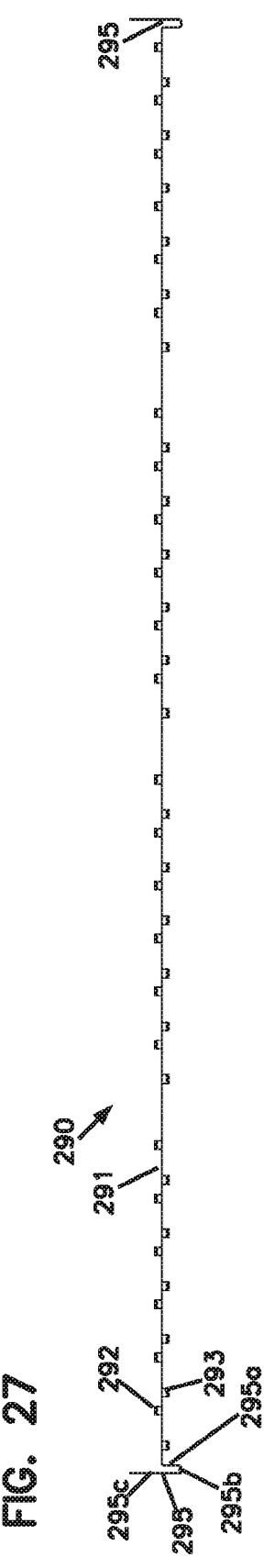
FIG. 27 is a front view of the bonding strip shown in FIG. 25.

With continued reference to FIGS. 3 and 4, a central metal bonding strip 290 is shown as extending between the front and rear frame parts 210, 240 and further defines the jack receptacle openings 202. The bonding strip 290, which is shown in isolation at FIGS. 25-28, operates to ground each jack module 120 to the frame 102, which can be formed from a metal material such as steel. As most easily seen at FIG. 1, the central bonding strip 290 extends through each bezel assembly 200 and is secured to each end of the frame 102. The bonding strip 290 includes a main body 291 and a plurality of grounding contact elements 292, 293 extending away from the main body 291 and into each of the plurality of jack receptacle openings 202. Spacing or position control elements 294 can be provided on the bonding strip 290 to aid in locating and spacing the bezel assemblies 200.

Figure 30A:
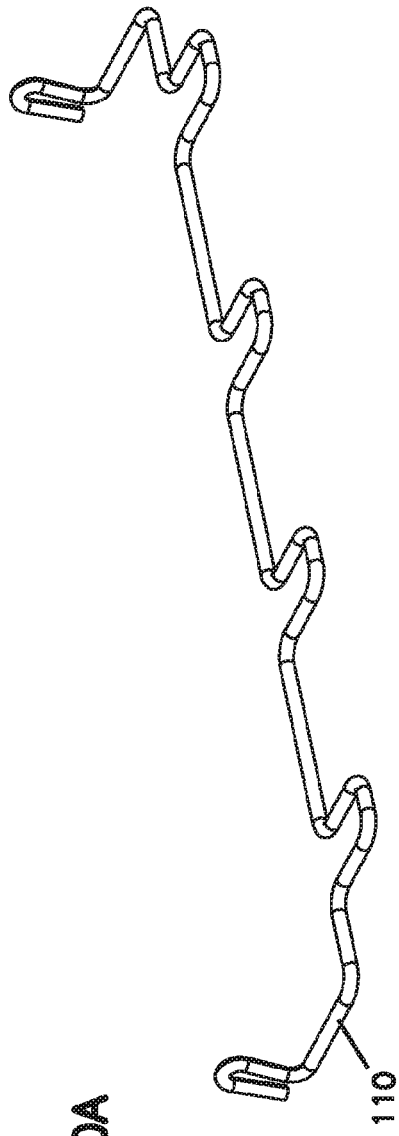
FIG. 30A is a perspective view of a cable management bar of the patch panel system shown in FIG. 30.
Figure 30B:
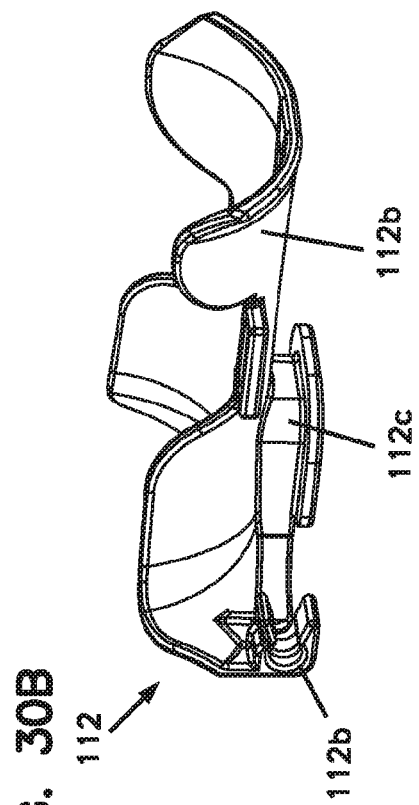
FIG. 30B is a perspective view of a cable management element of the patch panel shown in FIG. 30.

In one aspect, the central bonding strip 290 extends across the entire frame 102 and is secured to the frame 102 via a pair of fastening assemblies 108. As can be seen at FIG. 30, the fastening assemblies 108 also secure a cable management bar 110 that holds cable management elements 112. The cable management bar 110 is shown in isolation at FIG. 30A and a cable management element 112 is shown in isolation at FIG. 30B. In one aspect, the cable management bar 110 is expanded from its natural state to extend to the fastening assemblies 108. A cable management element 112 is provided for each bezel assembly 200 and aids in guiding and supporting cables extending from the jack modules 120. Each cable management element 112 includes a curved cable support member 112a. Each cable management element is snap-fit onto the cable management bar 110 via a pair of connecting elements 112a. A guide channel 112b also aids in securing the cable management element 112 to the guide bar 110.

The fastening assembly 108 includes a bracket 108a having threaded extensions 108b, 108d. The bonding strip 290 is rigidly fixed to the frame 102 by securing nuts 108c to the threaded extensions 108b while the cable management bar 110 can be secured by the threaded extensions 108d. Due to this fixed connection between the bonding strip 290 and the frame 102, warping or bending of the bonding strip 290 is a concern if the bonding strip 290 is made slightly too long or if the frame 102 is made slightly too short. To resolve this issue, the bonding strip 290 is provided with a length compensation feature 295 at each end of the bonding strip 290. Each length compensation feature includes a first segment 295a extending generally orthogonally from the main body 291 in a first direction, a second segment 295b extending generally parallel to the main body 291, and a third segment 295c extending in a second direction opposite the first direction. The third segment 295c is the portion of the bonding strip 290 that is connected to the frame 102 via the fastening assembly 108. Such a structure allows for greater tolerance of the length of the main body 291. For example, if the main body 291 is formed at slightly too long, the segment 295a can simply and easily deflect towards the segment 295c without exerting a bending or warping force onto the main body 291.

Figure 28:
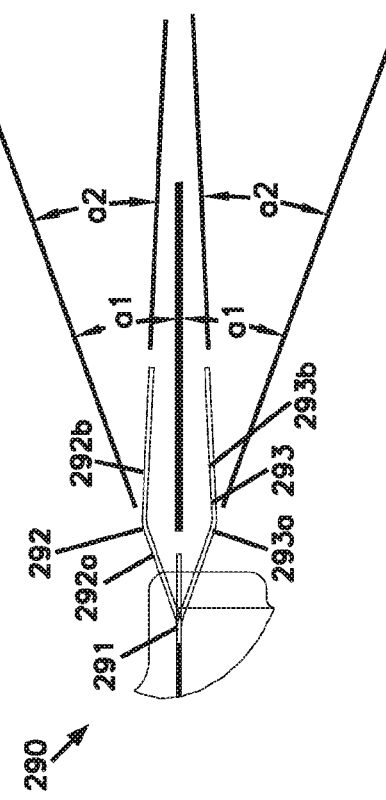
FIG. 28 is a cross-sectional side view of the bonding strip shown in FIG. 25.

In one aspect, the central bonding strip 290 is disposed between the upper row 202a and the lower row 202b of the jack receptacle openings 202. As shown, grounding contact elements 292 extend upwardly into the upper row 202a of jack receptacle openings 202 while grounding contact elements 293 extend downwardly into the lower row 202b of jack receptacle openings 202. With reference to FIG. 28, it can be seen that each grounding contact element 292, 293 includes a first extension segment 292a, 293a and a second extension segment 292b, 293b. As shown, the first extension segments 292a, 293a extend upwardly or downwardly at a first angle a1 with respect to the main body 291 while the second extension segments 292b, 293b extend at a second angle a2 with respect to the first extension segments 292a, 293a. In the example shown, the first angle a1 is about 20 degrees while the first angle is about 22 degrees.

With reference to FIGS. 9-17, the first or front frame part 210 is shown in isolation. As noted previously, the front frame part 210 includes a perimeter wall 212, and interior walls 214, 216. In one aspect, the perimeter wall 212 has first, second, third, and fourth side segments 212a, 212b, 212c, 212d. The interior wall 214 extends between the first and second side segments 212a, 212b while the interior walls 216 extend between the side segments 212c, 212d. As shown, the front frame part 210 additionally includes end walls 218 extending from the perimeter wall 212 and extending between the side segments 212c, 212d. Although directional references, such as top and bottom, may be used, it is noted that the front frame part 210 is symmetrical about the interior wall 214, thereby allowing the front frame part 210 to be connected to the rear frame part in multiple orientations. As a result of this configuration, the jack modules 120 in one row (e.g. the upper row) are disposed in a mirrored or opposite orientation to the jack modules in the other row (e.g. the lower row).

The front frame part 210 is also shown as including four extension members 220 extending from the perimeter wall 212, each of the extension members 220 is provided with a latch member 220a. The latch members 220a snap into the previously mentioned apertures 106 in the frame 102 and provide for a secure, snap-fit type connection between the front frame part 210 and the frame 102. When assembling the patch panel 100, the front frame part(s) 210 is first attached to the panel frame 102.

As shown, each end of the interior walls 216 is bounded by an extension member 222 having a latch member 222a. The latch members 222a are received into corresponding apertures 252a of extension members 252 on the rear frame part 240 in a secure, snap-fit type of connection to hold the front and rear frame parts 210, 240 together. The rear frame part 240 is shown in isolation at FIGS. 18-24. Similarly configured extension members 224, each having a latch member 224a, are provided at the ends of each end wall 218. The latch members 224a are received into corresponding apertures 254a of extension members 254 on the rear frame part 240 in a secure, snap-fit type of connection to further hold the front and rear frame parts 210, 240 together. Although latch members 222a, 224a are shown on the front frame part 210 and apertures 252a 254a are shown on the rear frame part 240, the opposite arrangement can be provide without departing from the concepts presented herein.

As shown, each of the interior walls 216 is provided with a central slot 216a for receiving the central bonding bar 290. The end walls 218 are also provided with a slot 218a for receiving the central bonding bar 290. Each of the interior walls 216 includes a tapering rib portion 216b extending along the extension members 222. The rib portion 216b functions to provide a guide surface for the jack modules 120 as they are being inserted into the frame apertures 202. As most easily seen at FIGS. 10, 16, and 17, the interior walls 216 are provided with a rounded profile (e.g. semi-circular, dome-shaped, etc.) in which each interior wall has a minimum height proximate the rib portions 216b and a maximum height proximate the central slot 216a. The rounded profile of the interior walls 216 allows for a resulting clearance gap or space 216c to be formed between the interior walls 216 and the extension members 222, thereby enabling the extension members 222 to be inwardly deflectable towards the interior walls 216. When the rear frame part 240 is being mounted onto the front frame part 210, the extension members 222 deflect into the clearance gap or space 216c until the latch members 222a snap into the apertures 252a. A small gap between the extension members 224 and the end walls 218 exists for this same purpose.

With reference to FIGS. 18-24, the second or rear frame part 240 is shown in isolation. As noted previously, the rear frame part 240 includes a perimeter wall 242, and interior walls 244, 246. In one aspect, the perimeter wall 242 has first, second, third, and fourth side segments 242a, 242b, 242c, 242d. The interior wall 244 extends between the first and second side segments 242a, 242b while the interior walls 246 extend between the side segments 242c, 242d. As shown, the rear frame part 240 additionally includes end walls 248 extending from the perimeter wall 242 and extending between the side segments 242c, 242d. The end walls 248 are provided with slots 248a for receiving the central bonding bar 290. Although directional references, such as top and bottom, may be used, it is noted that the rear frame part 240 is symmetrical about the interior wall 244, thereby allowing the rear frame part 240 to be connected to the rear frame part in multiple orientations.

In one aspect, the rear frame part 240 includes extension members 250 and corresponding latch members 250a. The extension members 250 are aligned with each aperture 202 and extend in a direction from the perimeter wall 242 towards the front frame part 210. The extension members 250 are also angled slightly inward towards each other such that the latch members 250a extend further into the openings 202. Each of the latch members 250a engages with the latching feature 120f on an inserted jack module 120. A ramped surface 250b can be provided on the extension members 250 to aid in lifting the latch members 250a away from the jack module body 120a during initial insertion of the jack module 120. The jack modules 120 are inserted into the bezel assembly 200 from the side of the rear frame part 240. Accordingly, an extension members 250 will deflect outwardly (i.e. away from interior wall 244 and towards the perimeter wall 242) as the jack module 120 is being inserted until the latch member 250a snaps into a space 120g defined between two latch members 120h of the latching feature 120f At this point, the jack module 120 is locked into the opening 202. When a jack module 120 is inserted into an opening 202, the body 120a of the jack module 120 backs up the extension member 222 of the front frame part 210 such that the extension member can no longer be deflected inwardly. Thus, when a jack module 120 is inserted into an opening 202, the latch member 222a is fully locked into the aperture 252a and is unable to be de-latched as long as the jack module 120 is inserted.

At the location where the extension members 250 extend from the perimeter wall 242, a recessed area 242e is provided such that a tool (e.g. a screwdriver) can be inserted between the extension member 250 and an inserted jack module 120. Thus, the recessed area 242e provides a mean by which the latch member 250a can be lifted by the tool and out of the space 120g to de-latch the jack module 120 from the latch member 250a. Once de-latched, the jack module 120 can be removed from the opening 120.

To assembly the panel 100, the front frame parts 210 are first mounted to the frame 102 such that the latch members 220a are snap-fit into the frame apertures 106, as mentioned previously. The next step in the assembly process is to install the central bonding bar 290 into the slots 216a, 218a of each of the interior walls 216 and walls 218 of the front frame parts 210. At this point, the main body 291 of the central bonding bar 290 will be coplanar with the interior wall 214 of the front frame part 210. After the bonding bar 290 is installed, the rear frame parts 240 are snap-fit onto the front frame parts 210 such that the latch members 222a and 224a are respectively snapped into recesses 252a and 254a and such that the bonding bar 290 is received in slots 248a. Once the rear frame part 240 is connected to the front frame part 210, the bonding bar 290 is secured between and is coplanar with the interior walls 214 and 244. At this point, any desired number of jack modules 120 can be installed into and/or removed from the openings 202, as described above. Once a jack module 120 is installed, the contact element 292 or 293 of the bonding bar 290 is slightly deflected by the jack module body 120a such that the contact element 292 or 293 maintains spring contact with the jack module body 120a.

The above specification, examples and data provide a complete description of the manufacture and use of the composition of the invention. Since many embodiments of the invention can be made without departing from the spirit and scope of the invention, the invention resides in the claims hereinafter appended.

| Parts List | |
|---|---|
| 10 | patch panel system |
| 100 | patch panel |
| 102 | frame member |
| 104 | apertures |
| 106 | apertures |
| 108 | fastening assembly |
| 110 | cable management bar |
| 112 | cable management elements |
| 120 | jack modules |
| 120a | support element |
| 120b | connecting member |
| 120c | guide channel |
| 120a | main body |
| 120b | front end |
| 120c | rear end |
| 120d | jack receptacle |
| 120e | element |
| 120f | latching feature |
| 120g | space |
| 120h | latch members |
| 200 | multiple bezel assemblies |
| 202 | apertures |
| 202a | upper row |
| 202b | lower row |
| 204 | first open end |
| 206 | second open end |
| 210 | front frame part |
| 212 | peripheral wall |
| 212a | fourth side segments |
| 212b | fourth side segments |
| 212c | fourth side segments |
| 212d | fourth side segments |
| 214 | first interior wall |
| 215 | labelling frame |
| 215a | labeling card |
| 215b | indicia |
| 215c | overhanging members |
| 216 | second interior walls |
| 216a | central slot |
| 216b | tapering rib portion |
| 216c | space |
| 218 | end walls |
| 218a | slot |
| 220 | extension members |
| 220a | latch member |
| 222 | extension member |
| 222a | latch member |
| 224 | configured extension members |
| 224a | latch member |
| 240 | rear frame part |
| 242 | peripheral wall |
| 242a | fourth side segments |
| 242b | fourth side segments |
| 242c | fourth side segments |
| 242d | fourth side segments |
| 242e | recessed area |
| 244 | first interior wall |
| 246 | second interior walls |
| 248 | end walls |
| 248a | slots |
| 250 | extension members |
| 250a | latch members |
| 250b | ramped surface |
| 252 | extension members |
| 252a | apertures |
| 254 | extension members |
| 254a | apertures |
| 290 | central metal bonding strip |
| 291 | main body |
| 292 | grounding contact elements |
| 292a | first extension segment |
| 292b | second extension segment |
| 293 | grounding contact elements |
| 293a | first extension segment |
| 293b | second extension segment |
| 294 | position control elements |
| 295 | length compensation feature |
| 295a | first segment |
| 295b | second segment |
| 295c | third segment |

What is claimed is:

1. A multiport telecommunications bezel assembly comprising:
    a. a frame defining a first peripheral wall and at least one first interior wall defining a two-row array of a plurality of jack receptacle openings extending from a first open end to a second open end; and
    b. a metal bonding strip secured to the frame and being located between first and second rows of the two-row array, the bonding strip including a main body from which a plurality of grounding contact elements extend into each of the plurality of jack receptacle openings.

2. The multiport telecommunications bezel assembly of claim 1, wherein the frame includes a plurality of latches for removably securing jacks within the plurality of jack receptacle openings.

3. The multiport telecommunications bezel assembly of claim 1, further including a rack panel to which the frame is secured.

4. The multiport telecommunications assembly of claim 3, wherein the rack panel has a 1U rack height.

5. The multiport telecommunications bezel assembly of claim 1, further including a plurality of jacks inserted into the plurality of jack receptacle openings.

6. The multiport telecommunications bezel assembly of claim 5, wherein each of the plurality of jacks can be inserted into one of the plurality of jack receptacle openings from either the first open end or second open end.

7. The multiport telecommunications bezel assembly of claim 1, wherein the grounding contact elements include a plurality of first and second grounding contact elements that alternately extend at an angle in a direction toward the jack receptacle openings of the first row and at an angle in a direction toward the jack receptacle openings of the second row.

8. The multiport telecommunications bezel assembly of claim 7, wherein each of the plurality of first grounding contact elements extend at a first angle towards the jack receptacle openings of the first row and wherein the plurality of second grounding contact elements extend at a second angle towards the jack receptacle openings of the second row.

9. The multiport telecommunications bezel assembly of claim 8, wherein the first and second angles have an equal magnitude.

10. The multiport telecommunications bezel assembly of claim 7, wherein each of the plurality of first and second grounding contact elements includes a first extension segment extending at a first angle from a plane defined by the main body and an adjacent second extension segment extending at a second angle from the first extension segment in a direction towards the plane, wherein the first and second segments are unequal.

11. The multiport telecommunications bezel assembly of claim 10, wherein the first angle is 20 degrees and the second angle is 22 degrees.

12. The multiport telecommunications bezel assembly of claim 1, wherein the plurality of grounding contact elements extend from the main body towards the first open end.

* * * * *

UNITED STATES PATENT AND TRADEMARK OFFICE
CERTIFICATE OF CORRECTION

PATENT NO. : 11,838,700 B2
APPLICATION NO. : 17/833204
DATED : December 5, 2023
INVENTOR(S) : Gordon John White Page 1 of 1

It is certified that error appears in the above-identified patent and that said Letters Patent is hereby corrected as shown below:

In the Claims

Column 10, Line 42, Claim 4: "telecommunications assembly" should read --telecommunications bezel assembly--

Signed and Sealed this
Thirty-first Day of December, 2024

Derrick Brent
*Acting Director of the United States Patent and Trademark Office*